(12) United States Patent
Jeon

(10) Patent No.: US 6,336,615 B1
(45) Date of Patent: Jan. 8, 2002

(54) DEVICE FOR MOUNTING SPEAKER ON DISPLAY

(75) Inventor: Chang Wook Jeon, Kyongsangbuk-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/469,312

(22) Filed: Dec. 22, 1999

(30) Foreign Application Priority Data

Mar. 12, 1999 (KR) ................................................ 99/8378

(51) Int. Cl.[7] ............................................... A47B 96/06
(52) U.S. Cl. .............................. 248/220.42; 248/442.2; 248/674
(58) Field of Search ................................. 181/207, 208, 181/144; 248/157, 423, 563, 918, 220.22, 223.41, 224.7, 225.11, 220.43, 638, 562, 442.2, 220.42, 674

(56) References Cited

U.S. PATENT DOCUMENTS

| 5,400,408 A | * | 3/1995 | Lundgren et al. ............. 381/88 |
| 5,448,647 A | * | 9/1995 | Koizumi ....................... 381/90 |
| D366,478 S | * | 1/1996 | Daniels et al. ............. D14/114 |
| 5,587,876 A | * | 12/1996 | O'Brien et al. ............. 361/682 |
| 5,627,901 A | * | 5/1997 | Josephson et al. .......... 381/155 |
| 5,666,263 A | * | 9/1997 | Mundt et al. ............... 361/683 |
| 5,683,070 A | * | 11/1997 | Seed ........................ 248/442.2 |
| 5,701,347 A | * | 12/1997 | Daniels et al. ................ 381/24 |
| 5,769,374 A | * | 6/1998 | Martin et al. ........... 248/221.11 |
| 5,850,998 A | * | 12/1998 | Parsey et al. .......... 248/223.21 |
| 5,870,485 A | * | 2/1999 | Lundgren et al. ........... 381/306 |

* cited by examiner

Primary Examiner—Ramon O. Ramirez
Assistant Examiner—A. Joseph Wujciak
(74) Attorney, Agent, or Firm—Fleshner & Kim, LLP

(57) ABSTRACT

Device for mounting a speaker on a display having a back cover and a cabinet mounted on a front of the back cover, including a plurality of bosses formed on an inside surface of the cabinet, vibration attenuation means coupled to the bosses, and holding projections on the speaker fixed to the vibration attenuation means, thereby, attenuating vibration from the speaker by the vibration attenuation means, whereby preventing flickering of an image.

25 Claims, 7 Drawing Sheets

DEVICE FOR MOUNTING SPEAKER ON DISPLAY

BACKGROUND OF THE INVENTION

1. Field of the Invention

The present invention relates to a display, and more particularly, to a device for mounting a speaker on a display.

2. Background of the Related Art

Presently, speaker of built-in or exterior mounting type is provided to a display, to form a multimedia. FIG. 1 illustrates a perspective view of a related art device for mounting a speaker on a display, FIG. 2 illustrates a section across line I—I in FIG. 1, and FIG. 3 illustrates a section across line II—II in FIG. 1, referring to which the related art device for mounting an exterior speaker on a display will be explained. There are a Braun tube 30 and a cabinet 20 fastened to a front surface of a back cover 10, and a speaker 40 mounted on a side of the back cover 10.

This will be explained in detail.

There are bosses 26 on an inside surface of a front portion of a cabinet 20, and projections, i.e., lugs 32 on outside of the Braun tube 30 for fastening to the bosses 26 with screws 34. And, there are ribs 22 on inside of sides of the cabinet 20 for fastening the back cover 10, and a front portion of the back cover 10 has projection, to form a coupling portion 12 to be brought into contact with the ribs 22. There may be a gap 'A' between the cabinet 20 and the back cover 10 caused by a difference of dimensions of the ribs 22 on the cabinet 20 and the coupling portion 12 of the back cover 10. In the meantime, portions of the coupling portion 12 of the back cover 10 are cut away, to form cut-away portions 14. A portion of each of the cut away portions 14 exposed through the gap 'A' acts as a hole 16 for mounting the speaker 40. By inserting and fastening holding projections 44 in one side of the speaker 40 to the holes 16, the speaker 40 can be fastened to the display. The holding projections 44 may be either fabricated separately and fitted to the speaker 40, or formed as a unit with the speaker 40.

A process for fastening the speaker 40 to the display will be explained, with reference to FIG. 2.

First, the holding projections 44 on the speaker 40 are inserted into respective holes 16 in the back cover 10 in a horizontal direction through the gap 'A' formed in the coupled portion of the cabinet 20 and the back cover 10. Then, the holding projections 44 are pushed down so that recesses 46 in the holding projections 44 are caught by the holes 16, thereby completing mounting of the speaker 40 to the display. However, the aforementioned device for mounting a speaker to a display does not attenuate vibration generated in the speaker 40, but transmits to the Braun tube 30 directly, to vibrate the Braun tube 30, seriously. Because the vibration generated during operation of the speaker 40 is transmitted to the back cover 10 through the holding projections 44 on the speaker 40, and the vibration transmitted to the cabinet 20 is transmitted to the Braun tube 30 through a contact surface between the cabinet 20 and the Braun tube 30, at last. As explained, since the vibration generated in the speaker 40 is transmitted in succession through a contact surface between solid state bodies, the vibration is transmitted to the Braun tube 30 directly without any attenuation, and the vibration transmitted to the Braun tube 30 resonate with the shadow mask mounted on an inside of the Braun tube 30, to cause flickering of an image. And, this problem impedes an increase of wattage of the speaker. Particularly, since the flickering of image is the most serious at a frequency below 200 Hz, mounting of a high quality speaker on the display has been very difficult actually because deterioration of sound quality is resulted in as lowering of a low sound band is not possible.

SUMMARY OF THE INVENTION

Accordingly, the present invention is directed to a device for mounting a speaker on a display that substantially obviates one or more of the problems due to limitations and disadvantages of the related art.

An object of the present invention is to provide a device for mounting a speaker on a display, which can prevent an image flickering.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for mounting a speaker on a display having a back cover and a cabinet mounted on a front of the back cover includes a plurality of bosses formed on an inside surface of the cabinet, vibration attenuation means coupled to the bosses, and holding projections on the speaker fixed to the vibration attenuation means, thereby, attenuating vibration from the speaker by the vibration attenuation means.

The vibration attenuation means includes a supporting member, and a vibration attenuation member coupled to the supporting member for preventing direct contact of the supporting member to the bosses.

The supporting member has coupling recesses for fixing the holding projections on the speaker after passing through the holes in front portion of the back cover.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
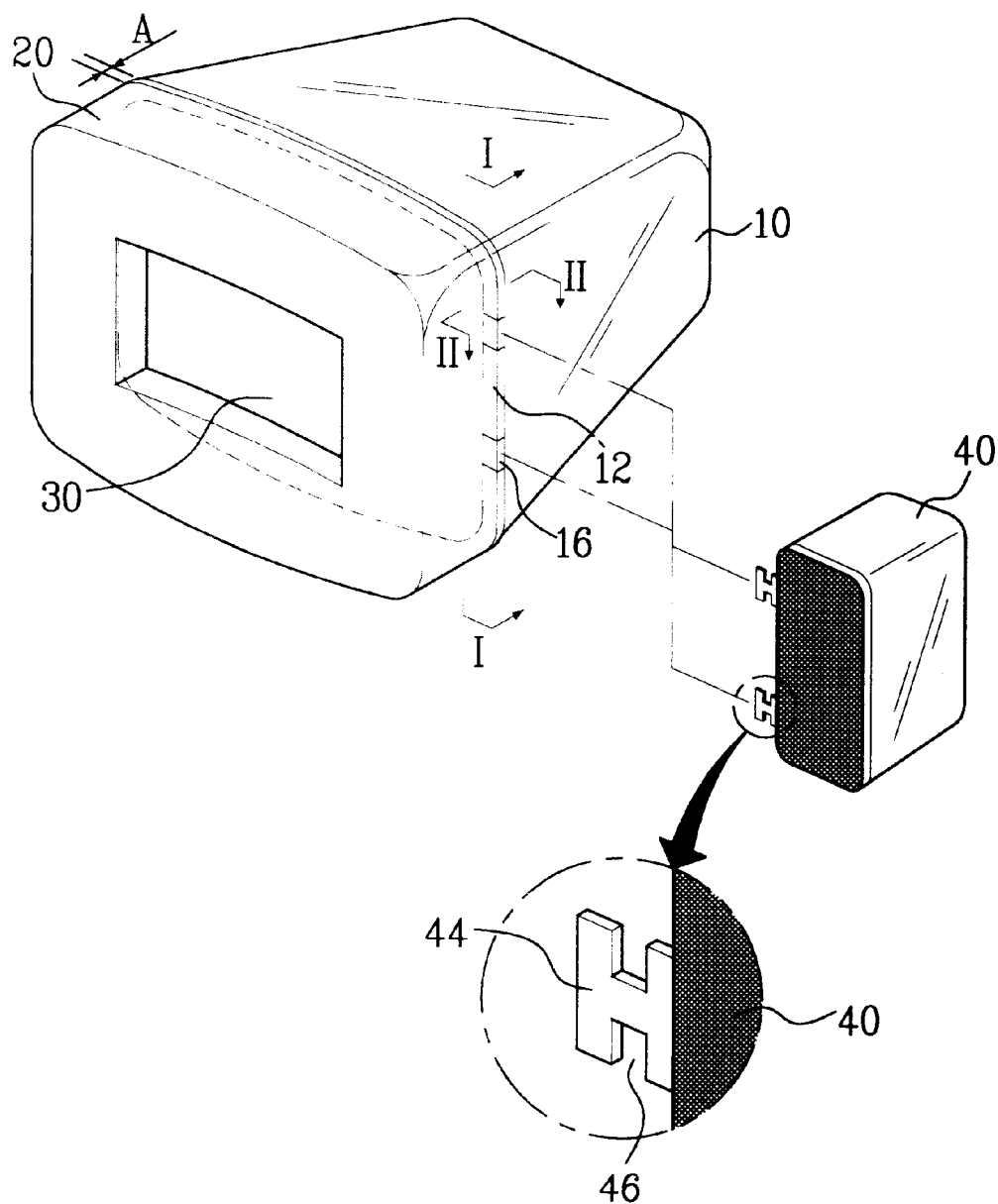
FIG. 1 illustrates a perspective view of a related art device for mounting a speaker on a display.
Figure 2:
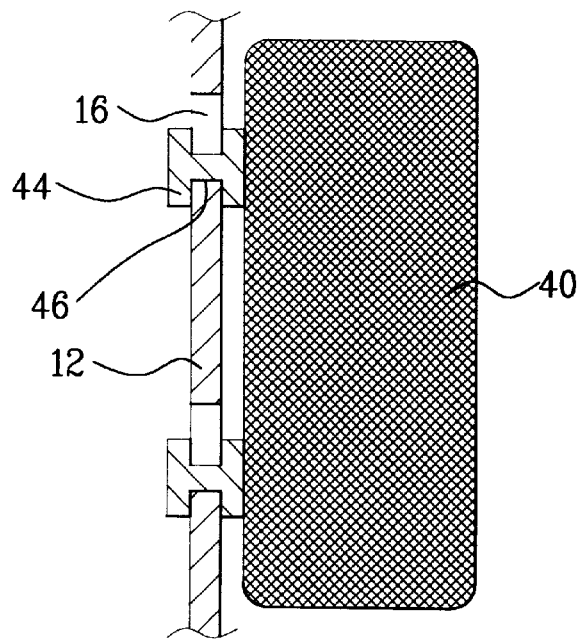
FIG. 2 illustrates a section across line I—I in FIG. 1.
Figure 3:
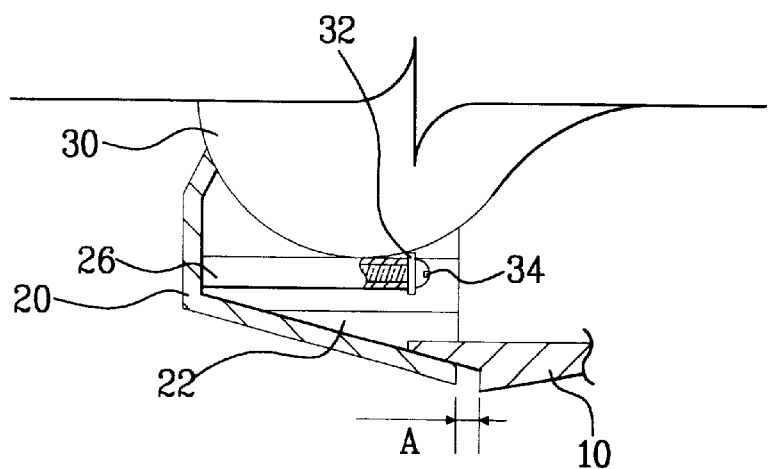
FIG. 3 illustrates a section across line II—II in FIG. 1.
Figure 4:
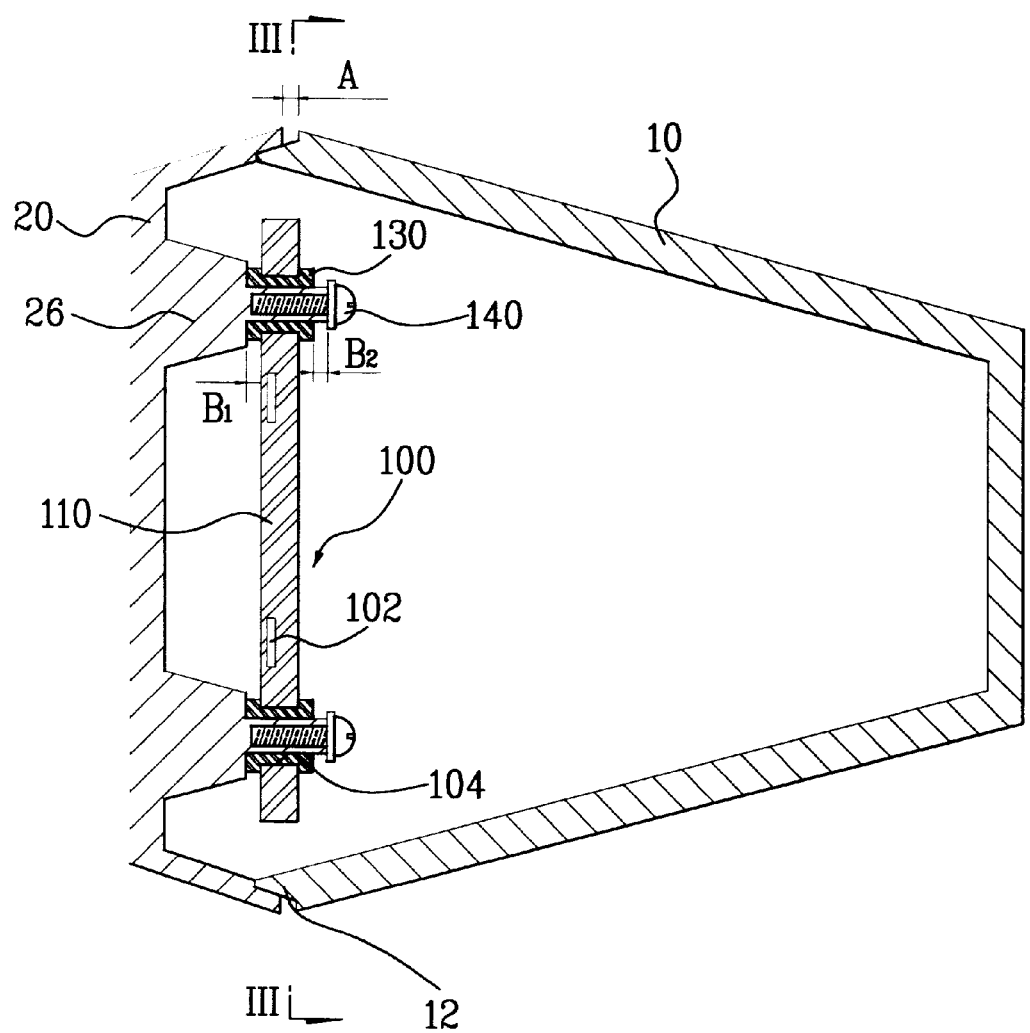
FIG. 4 illustrates a section showing a device for mounting a speaker on a display in accordance with a first preferred embodiment of the present invention, schematically.
Figure 5:
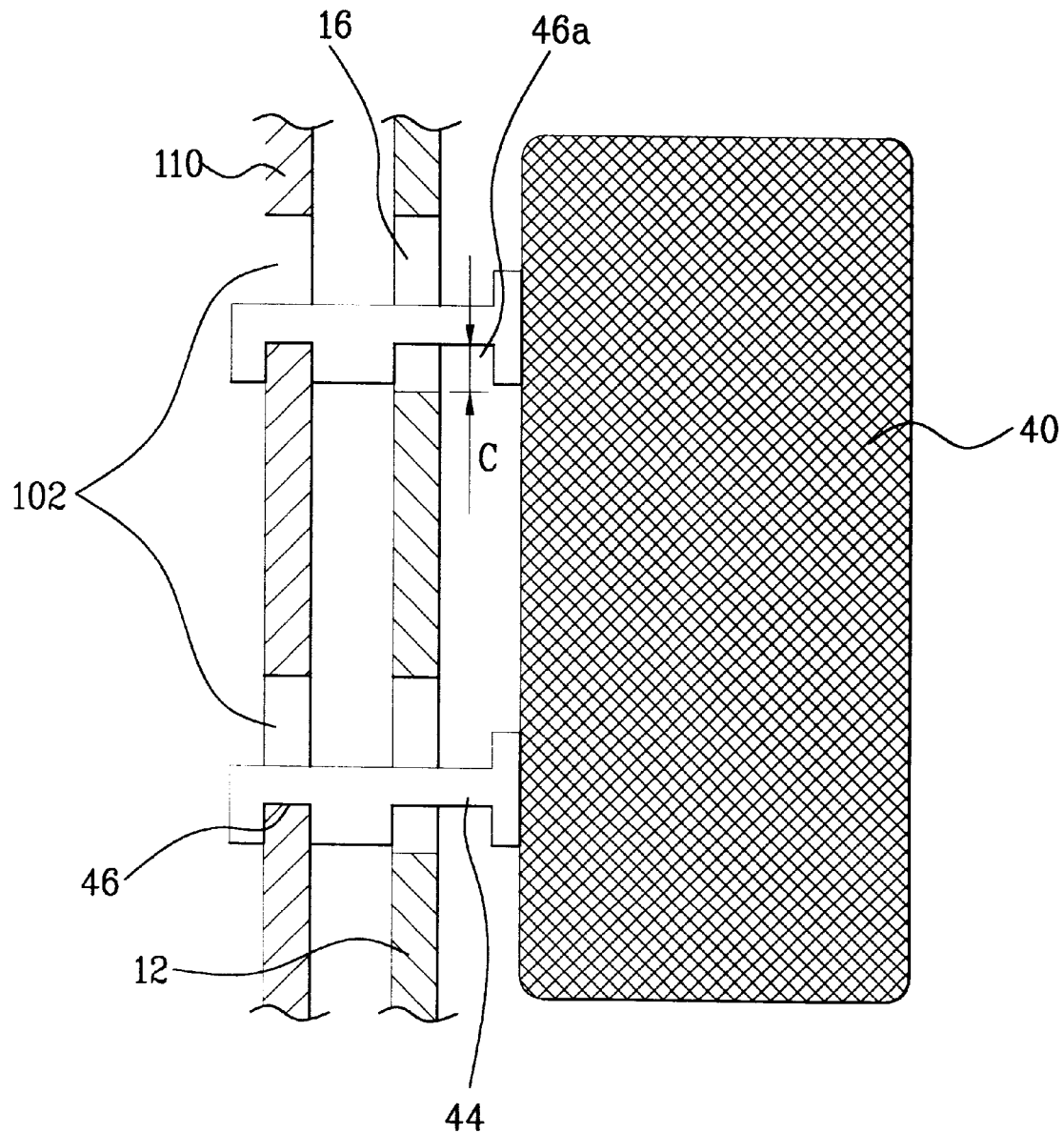
FIG. 5 illustrates a section across line III—III in FIG. 4.
Figure 6:
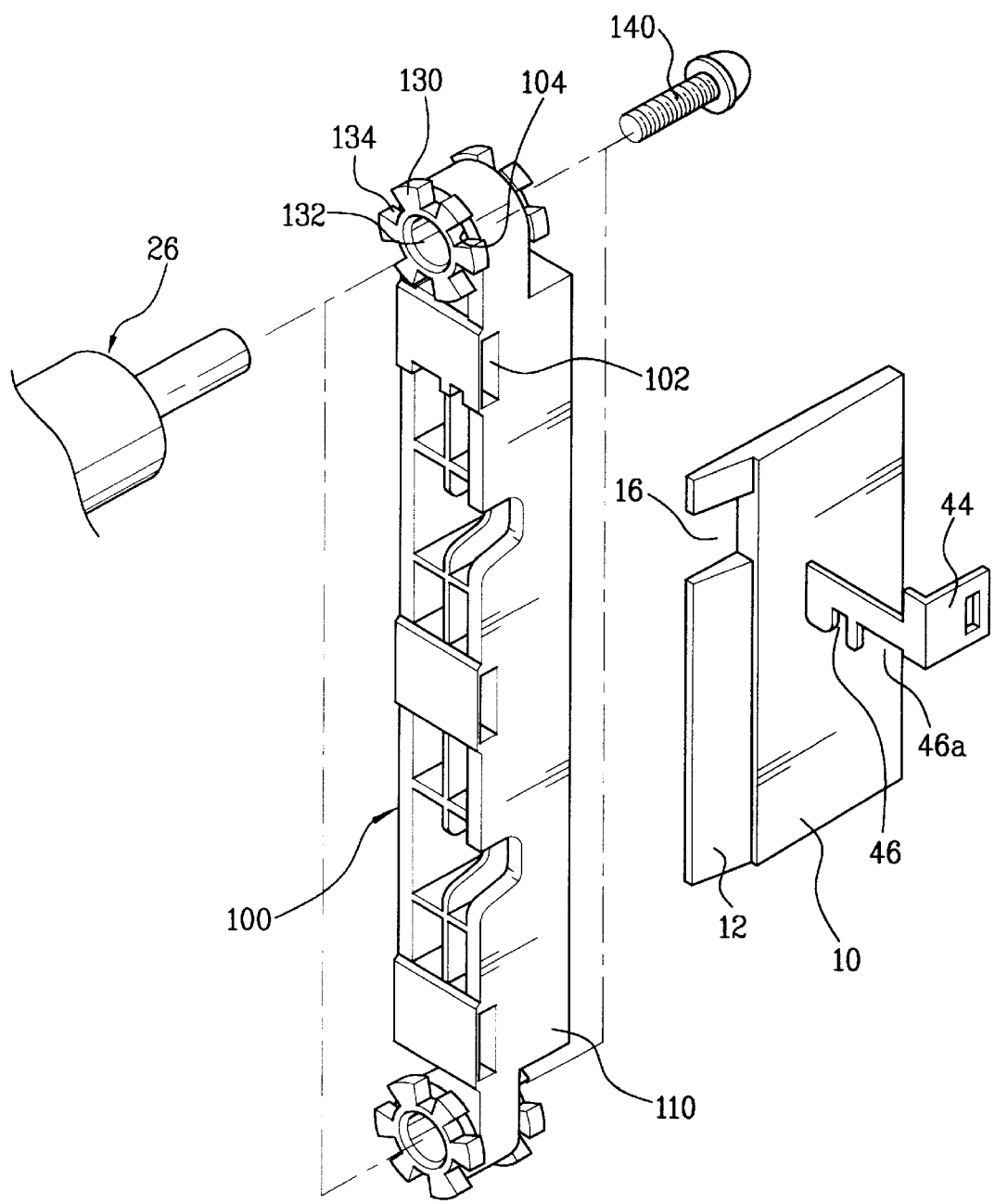
FIG. 6 illustrates a perspective disassembled view of FIG. 4.

Reference will now be made in detail to the preferred embodiments of the present invention, examples of which are illustrated in the accompanying drawings. Components of the present invention identical to the related art will be given the same name and symbols, and explanations on the same will be omitted. FIG. 4 illustrates a section showing a device for mounting a speaker on a display in accordance with a first preferred embodiment of the present invention schematically, FIG. 5 illustrates a section across line III—III in FIG. 4, and FIG. 6 illustrates a perspective disassembled view of FIG. 4, referring to which the device for mounting a speaker on a display will be explained.

Alike the case of related art, a cabinet 20 is fastened to a front face of the back cover 10, to form a gap 'A' in a coupled portion of the cabinet 20 and the back cover 10, to form a plurality of holes 16 at preset positions of the coupling portions 12 of the back cover 10 for mounting a speaker 40. There are holding projections 44 each having a recess 46 formed on one side of the speaker 40. The present invention suggests to mount the speaker 40 on a side of the back cover 10 with a vibration attenuation means 100 provided therebetween. That is, there are coupling bosses 26 on an inside surface of the cabinet 20 on left and right sides with reference to a front face of the Braun tube 30 in symmetry, the vibration attenuation means 100 is fastened to the bosses 26, and the speaker 40 is mounted at a side of the vibration attenuation means 100 passing through the back cover 10.

The vibration attenuation means 100 will be explained.

The vibration attenuation means 100 includes a supporting member 110 of a substantially bar form and vibration attenuation members 130 coupled to an upper portion and a lower portion of the supporting member 110. In detail, there are pass through holes 104 in the upper portion and the lower portion of the supporting member 110, for inserting and fitting the vibration attenuation members 130. And, there are a plurality of coupling recesses 102 at predetermined positions of the supporting member 110, i.e., positions substantially corresponding to the holes 16 in the coupling portion 12 of the back cover 10 for inserting the holding projections 44 of the speaker 40. The vibration member 130 has a hollow portion 132 and outside diameters at both ends preferably greater than the same at a middle, and is formed of a material, such as rubber, which can attenuate vibration. And, a total length of the vibration attenuation member 130 is preferably formed longer than the pass through hole 104 in the upper portion and the lower portion of the supporting member 110, to provide a gap 'B1' between a contact surface between the boss 26 and the supporting member 110, for preventing a direct contact between the boss 26 and the supporting member 110. Also, a gap 'B2' is preferably provided at a contact surface between the supporting member 110 and the screw 140, for preventing the screw 140 from pressing the supporting member 110.

Figure 7:
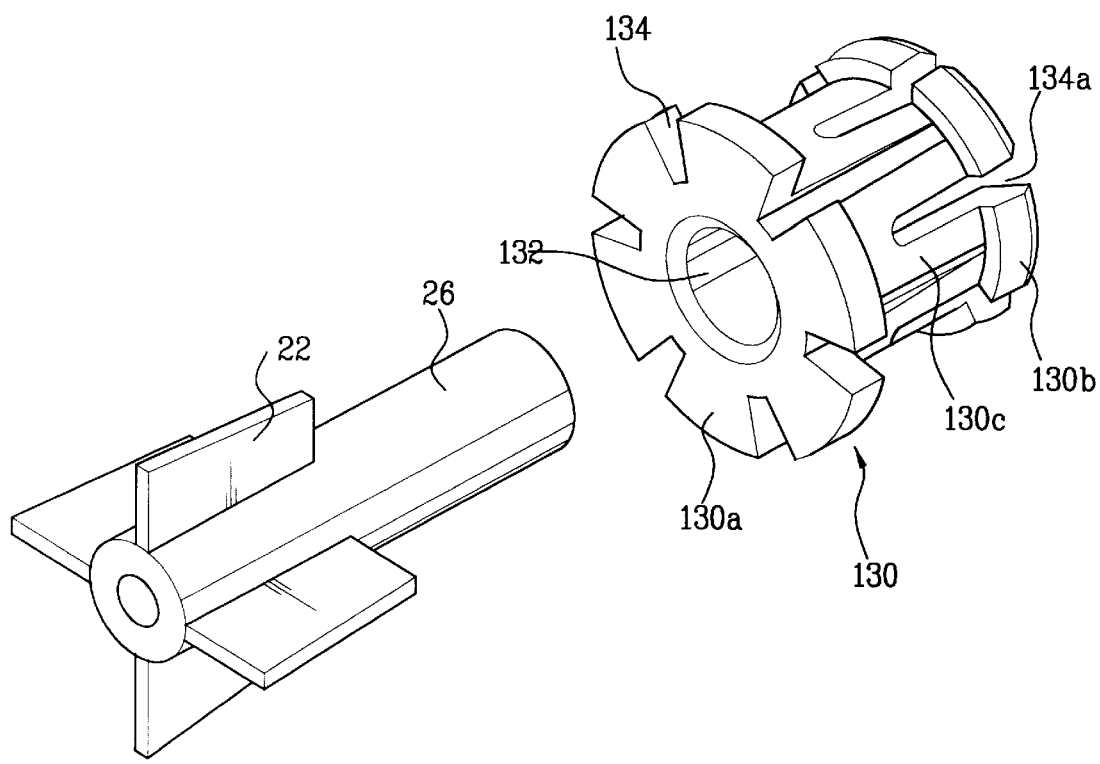
FIG. 7 illustrates a perspective disassembled view showing a fastening state of an attenuation member and a boss in FIG. 6; and, FIG. 8 illustrates a perspective view of a variation of the attenuation member in FIG. 6.

The vibration member 130 and the boss 36 to which the vibration member 130 is fitted will be explained in detail, with reference to FIGS. 6 and 7.

The vibration attenuation member 130 is hollow and cylindrical, inclusive of a center portion 130c for inserting in the pass through hole 104 in the supporting member 110, and end portions 130a and 130b each extended from the center portion 130 and having an outside diameter greater than an outside diameter of the center portion 130c. The outside diameter of the front end portion 130a is preferably formed greater than the outside diameter of the rear end portion 130b. There are a plurality of recesses 134 and 134a formed on an outer circumference of the front end portion 130a and the rear end portion 130b of the vibration attenuation member 130 for minimizing contact surfaces, that prevents transmission of the vibration generated in the speaker to the Braun tube. In order to facilitates an easy assembly of the vibration attenuation member 130 to the pass through hole 104 in the supporting member 110, the recesses 134a in the rear end portion 130b are preferably extended to a desired position of the center portion 130c. Because, once the rear end portion 130b of the vibration attenuation member 130 is inserted into the pass through hole 104 in the supporting member 110 with the rear end portion 130 pressed slender, the rear end portion 130b will restore an original form by an elastic force of the vibration attenuation member 130, to complete the assembly of the vibration attenuation member 130. In the meantime, preferably there are a plurality of ribs 22 formed on an outer circumference of the boss 26, for easy positioning in assembly and reducing a contact surface with the vibration attenuation member 130.

Figure 8:
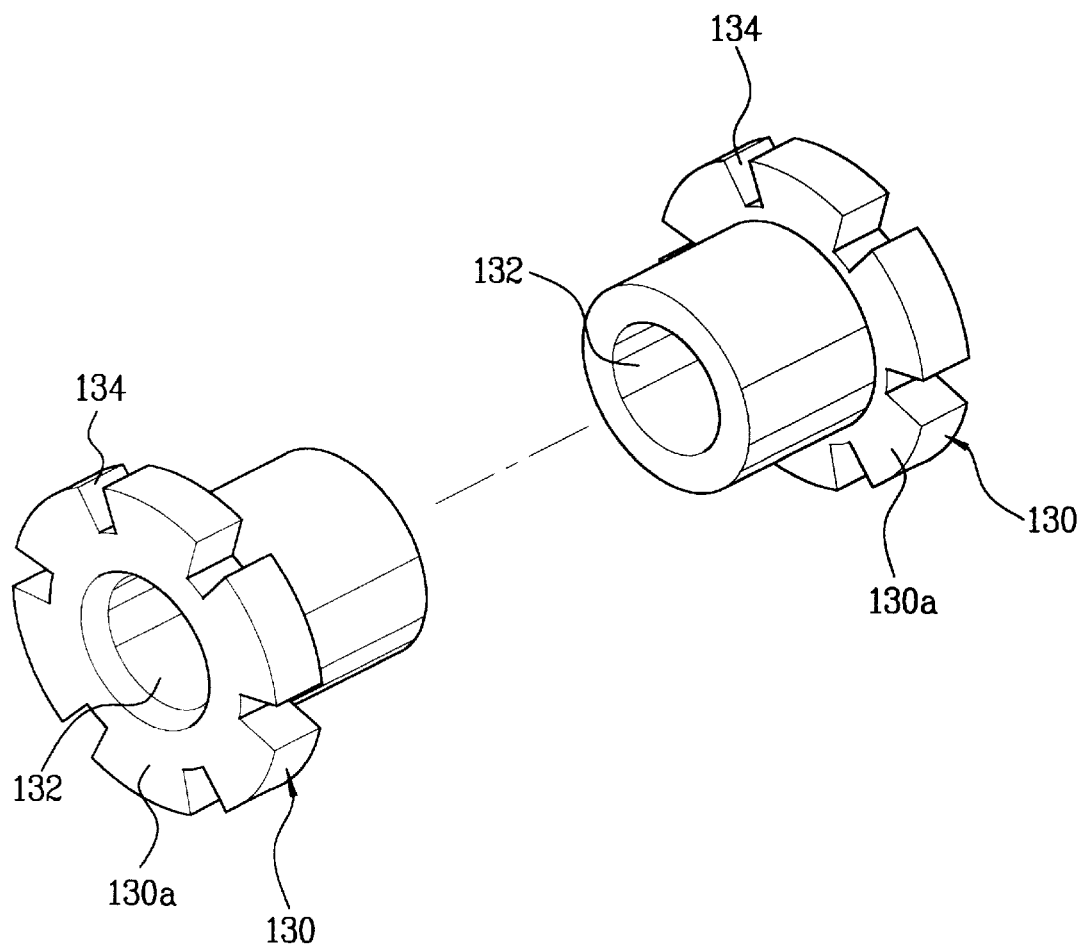

In the meantime, as shown in FIG. 8, the vibration member 130 may be formed of two pieces. In this instance, the recess portion formed in the center portion of one piece type may not be formed, the recesses 134 in the end portions 130a and 130b are still preferably provided.

The process for mounting the speaker on the display will be explained with reference to FIGS. 5 and 6.

Once the vibration attenuation member 130 is inserted in the pass through hole 104 in the supporting member 110, under this state, the boss 26 of the cabinet 20 is inserted in the hollow portion 134 of the vibration attenuation member 130. Then, a screw 140 is fastened to the boss 26 to fasten the supporting member 110 and the vibration attenuation member 130 to the cabinet 20. Under this state, by coupling the holding projections 44 on the speaker 40 to the coupling recesses 102 in the supporting member 110 via the holes 16 formed in the back cover 10, the speaker 40 can be mounted on the display. In this instance, for maintaining a gap 'C' between an underside of the holding projection 44 on the speaker 40 and an underside of the hole 16 formed in the back cover 10, it is preferable that forming positions of the holes 16 in the back cover 10 and the coupling recesses 102 of the supporting members 110 are adjusted appropriately, for preventing contact of the holding projections 44 on the speaker 40 to the back cover 10, thereby preventing the vibration from the speaker 40 from being transmitted to the back cover 10. In this instance, though the holding projections 44 identical to the ones used in the related art may be used while forming positions of the holes 16 in the back cover 10 and the coupling recesses 102 in the supporting member 110 are adjusted appropriately, it is preferable that, an under side of a rear portion of the holding projections 44 is cut away, to form the recess 46a. Though the aforementioned embodiment suggests to fix the speaker 40 by inserting the holding projections 44 on the speaker 40 in the coupling recesses 102 in the supporting member 110, the present invention is not limited to this, but fixing the speaker 40 in other methods are also possible.

The function of the aforementioned embodiment of the present invention will be explained with reference to FIGS. 4 and 5.

The vibration from the speaker 40 is transmitted to the holding projections 44. Since the holding projections 44 are spaced away from the holes 16 in the back cover 10 by a distance 'C', the vibration transmitted to the holding projections 44 is, not transmitted to the back cover 10, but only to the vibration attenuation means 100, i.e., to the supporting member 110 and the vibration attenuation members 130. As most of the vibration transmitted to the vibration attenuation means 100 is absorbed to the vibration attenuation member 130, it is possible that the vibration transmitted to the cabinet 20 is minimized and selected. Accordingly, the present invention permits to attenuate the vibration itself from the speaker 40 at the supporting member 110 and the vibration attenuation member 130, and to eliminate a howling generating band frequency(a shadow mask resonant frequency) by means of a natural frequency of the supporting member 110 and the vibration attenuation member 130 itself by selecting materials and forms of the supporting member 110 and the vibration attenuation member 130, appropriately.

Though mounting of a speaker on outside of a display is shown and explained in the aforementioned embodiment, the present invention is not limited to this, but application to a built-in type speaker is also possible.

As has been explained, the device for mounting a speaker on a display has the following advantages.

First, the attenuation of the vibration itself from the speaker at the supporting member and the vibration attenuation member and the elimination of a howling generating band frequency(a shadow mask resonant frequency) by means of a natural frequency of the supporting member and the vibration attenuation member itself permits to prevent flickering of image.

Second, because the flickering of image can be prevented, permitting a wattage of the speaker and a sound pressure higher, and a frequency band wider freely, a speaker performance can be improved, significantly.

It will be apparent to those skilled in the art that various modifications and variations can be made in the device for mounting a speaker on a display of the present invention without departing from the spirit or scope of the invention. Thus, it is intended that the present invention cover the modifications and variations of this invention provided they come within the scope of the appended claims and their equivalents.

What is claimed is:

1. A device for mounting a speaker on a display having a back cover and a cabinet mounted on a front of the back cover, the device comprising:
    a plurality of bosses provided on an inside surface of a cabinet of a display;
    vibration attenuation means coupled to the bosses; and
    holding projections configured for mounting on a speaker and fixed to the vibration attenuation means, wherein vibration from the speaker is attenuated by the vibration attenuation means.

2. The device as claimed in claim 1, wherein the vibration attenuation means includes:
    a supporting member; and
    a vibration attenuation member coupled to the supporting member for preventing direct contact of the supporting member to the bosses.

3. The device as claimed in claim 2, wherein the supporting member has a pass through hole at an upper portion and a lower portion of the supporting member, and the vibration attenuation member is coupled to the pass through hole.

4. The device as claimed in claim 3, wherein the vibration attenuation member has a front end projected from the pass through hole in the supporting member for preventing direct contact of the supporting member with the boss.

5. The device as claimed in claim 4, wherein the vibration attenuation member has a rear end projected from the pass through hole in the supporting member.

6. The device as claimed in claim 5, wherein the vibration attenuation member has a plurality of recesses on both ends of the vibration attenuation member in a circumferential direction.

7. The device as claimed in claim 6, wherein the recesses in the rear end of the vibration attenuation member are extended to a center portion of the vibration attenuation member.

8. The device as claimed in claim 7, wherein the boss has a plurality of ribs formed on an outer circumference thereof.

9. The device as claimed in claim 2, wherein the supporting member has coupling recesses for fixing the holding projections on the speaker after passing through holes in a front portion of the back cover.

10. The device as claimed in claim 9, wherein the holding projections are configured so that when passed through the holes in the back cover, the holding projections are spaced a predetermined distance from edges of the holes.

11. The device as claimed in claim 1, wherein the display comprises a cathode ray tube.

12. A device configured to mount a speaker on a system having a housing, the device comprising:
    a plurality of bosses formed on an inside surface of the system;
    at least one vibration attenuator coupled to the bosses; and
    holding projections mounted on the speaker and fixed to the at least one vibration attenuator, wherein vibration from the speaker is attenuated by the at least one vibration attenuator.

13. The device as claimed in claim 12, wherein the at least one vibration attenuator comprises:
    a supporting member; and
    a vibration attenuation member coupled to the supporting member for preventing direct contact of the supporting member to the bosses.

14. The device as claimed in claim 13, wherein the supporting member has a pass through hole at an upper portion and a lower portion of the supporting member, and the vibration attenuation member is coupled to the pass through hole.

15. The device as claimed in claim 14, wherein the vibration attenuation member has a front end projected from the pass through hole in the supporting member for preventing direct contact of the supporting member with the boss.

16. The device as claimed in claim 15, wherein the vibration attenuation member has a rear end projected from the pass through hole in the supporting member.

17. The device as claimed in claim 16, wherein the vibration attenuation member has a plurality of recesses on both ends of the vibration attenuation member in a circumferential direction.

18. The device as claimed in claim 17, wherein the recesses in the rear end of the vibration attenuation member are extended to a center portion of the vibration attenuation member.

19. The device as claimed in claim 18, wherein the boss has a plurality of ribs formed on an outer circumference thereof.

20. The device as claimed in claim 13, wherein the supporting member has coupling recesses for fixing the holding projections on the speaker after passing through the holes in a front portion of the back cover.

21. The device as claimed in claim 12, wherein the holding projections are configured so that when passed through the holes, the holding projections are spaced a predetermined distance from edges of the holes.

22. The device as claimed in claim 12, wherein the vibration attenuator comprises a plurality of ridges, and the holding projections each comprise a slot configured to engage with a respective one of the plurality of ridges.

23. The device as claimed in claim 12, where the system is a display device.

24. The device as claimed in claim 22, wherein the display device is a cathode ray tube.

25. A device for mounting a speaker on a display having a back cover and a cabinet mounted on a front of the back cover, the device comprising:
   a plurality of bosses formed on an inside surface of the cabinet;
   vibration attenuation dampeners coupled to the bosses;
   holding projections on the speaker and fixed to the vibration attenuation dampeners; and
   thereby attenuating vibration from the speaker by the vibration attenuation dampeners.

\* \* \* \* \*